June 2, 1931.  H. W. WEBB  1,808,193
PREPARATION OF FLEXIBLE CABLES
Filed Nov. 21, 1927

Inventor
Hartwell W. Webb
By Blackmore, Spencer & Hink
Attorneys

Patented June 2, 1931

1,808,193

UNITED STATES PATENT OFFICE

HARTWELL W. WEBB, OF FLINT, MICHIGAN, ASSIGNOR TO A C SPARK PLUG COMPANY, OF FLINT, MICHIGAN, A COMPANY OF MICHIGAN

PREPARATION OF FLEXIBLE CABLES

Application filed November 21, 1927. Serial No. 234,759.

This invention relates to flexible cables or shafting of the multistrand type, and has particular reference to the type of shafting used for driving speedometers of automotive vehicles.

In the past some difficulty and inconveniences have been experienced in properly shaping the end of the shaft so that it may be readily applied to the source of power and to the instrument to be operated. The cables have had applied to their round ends the usual tips which have been secured by means of screws or rivets and the ends of the cable have also been deformed so as to give the individual strands a permanent set to prevent their unraveling, but these methods have not proved satisfactory. In addition, in giving the cable end the permanent set, the individual strands have been weakened which accordingly weakens the shaft as a whole.

It is the object of the present invention to overcome difficulties of this kind and to construct a shafting which will have its end portion so formed that it will not weaken the shaft, and will readily lend itself to the application of the tip, or to the source of power or instrument.

The object of the invention is accomplished by heating, preferably between the two electric terminals, a short section of the cable and applying the current until a weld is formed, or the metal has been caused to adhere molecularly. The welded portion is then allowed to cool slowly causing it to anneal. While the metal is still in its heated condition, it is cut at the welded portion in a machine having a knife whose edges are so arranged that the individual strands of the wire will not project from the periphery at the end after the cut is made. In other words, the strands at the cut will be drawn toward the core of the cable.

The ends of the cable lengths, while still in their heated condition, are then placed in a die so as to give the end a squared formation, the term squared being used to indicate not only a four-cornered section, but any polygonal section. This squared section is preferably slightly tapered so that it may be readily inserted into the opening of a tip which is usually applied to the end of the cable. This tip may be omitted and the squared end applied directly to the instrument or source of power.

It is within the scope of the invention to omit the squaring operation and apply the tip directly to the rounded end of the flexible cable prepared in accordance with the invention for the reason that it is old to apply a tip directly to a rounded cable end.

The invention is disclosed on the accompanying drawings, in which.

Figure 1:
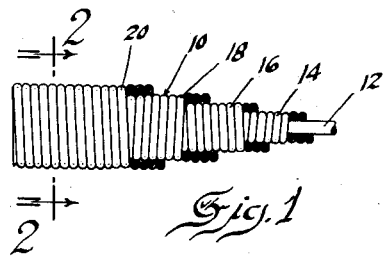
Figure 1 shows a view of a multistrand flexible cable or shafting to which my invention is applied.
Figure 2:
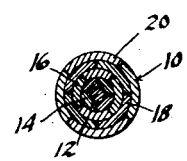
Figure 2 is a section through the cable taken on the line 2—2 of Figure 1.

Referring to the numbered parts on the drawings, 10 indicates a conventional type of multistrand flexible cable or shafting having the central core wire 12 and the outer wires 14, 16, 18 and 20 wound thereon. These individual wound wires, it is to be observed, are wound on the core 12 in alternate opposite directions in order to give the proper strength and stiffness to the cable and so that the shaft will have a minimum of torsional deformation for rated loads which is especially desirable for speedometer drive shafts, shafts for driving dental drills, or shafts for any other purposes for which a flexible drive cable may be needed.

The shafting 10 as it comes from the machine is in very long lengths, and in order to adapt it to the trade for use on speedometer drives, dental drills, etc., it is necessary to cut it into suitable lengths. If cut directly as taken from the machine, the individual windings 14, 16, 18 and 20 will unravel and leave a frayed end. It is, therefore, necessary to adopt some means to prevent the unraveling of the individual strands.

Figure 3:
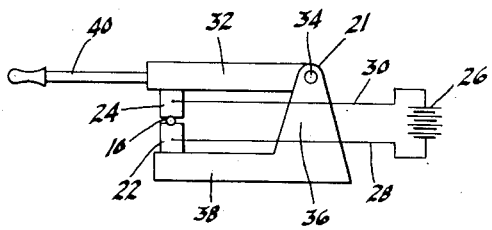
Figure 3 is a side view of the electrical machine for heating or welding a section of the cable.
Figure 4:
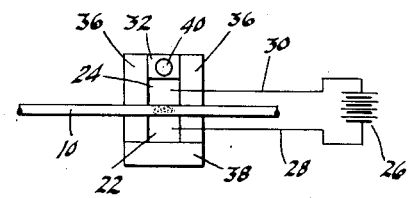
Figure 4 is a front view of the machine shown in Figure 3.

In Figures 3 and 4 is shown an electrical machine 21 having terminals 22 and 24 supplied with a current from a suitable source as shown at 26. The source of electrical energy 26 has the leads 28 and 30 which pass to the electrodes 22 and 24 respectively. The upper electrode 24 is secured to and suitably insulated from an arm 32 pivoted at 34 to an upright 36 forming a part of the base 38 of the machine. This arm 32 is provided with an operating handle 40 by means of which it may be raised to remove the wire 10 or lowered to bring the electrode 24 into contact with a new section of the wire. The lower electrode is rigidly mounted on and suitably insulated from the base 38.

With the contacts in position shown in Figures 3 and 4, a current will pass between the electrodes and through the wire 10 causing a section thereof to become heated and thereby forming a weld, and causing the individual strands of the cable to adhere molecularly. The arm 32 is then raised and the wire moved toward the cutter or removed from the electrical machine, and the welded section annealed in any suitable way, preferably by air cooling.

Figure 5:
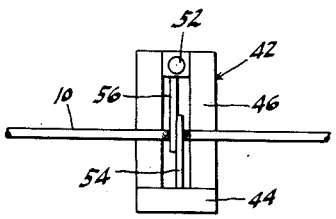
Figure 5 is a front view of the machine for cutting the cable.
Figure 6:
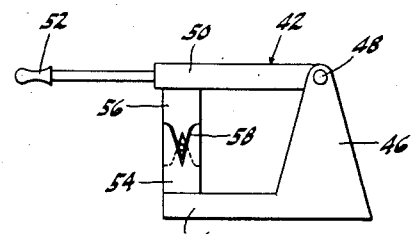
Figure 6 is a side view of the machine shown in Figure 5.

The wire 10 is now passed to the cutter 42 shown in Figures 5 and 6. This cutter comprises the base 44 having an upright 46 at one end. To the upright 46 there is pivoted at 48 an arm 50 having secured thereto an operating handle 52 so that the arm 50 may be raised and lowered to permit of the insertion and cutting of the wire. The base 44 has secured thereto a V-shaped knife blade or cutter 54, while the pivoted arm 50 has secured thereto a similarly shaped knife blade 56. The cutting edges of these blades are slightly tapered as shown at 58 in the Figure 6 so that as the upper knife 56 is forced downwardly to sever the wire, the beveled edges will cause the individual strands to bend toward the center and thereby prevent any projecting stub edges at the wire's periphery. Blades of this character are to be preferred because they will tend to draw the ends of the individual strands toward the center of the cable, although any suitable blade or cutter may be used.

If desired the welding machine 21 and the cutter 42 may be placed in parallel alignment so that the wire may be passed longitudinally from the welding operation to the cutting operation.

Figure 7:
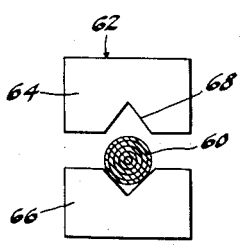
Figure 7 shows the die used for forming a squared section on the cable.
Figure 8:
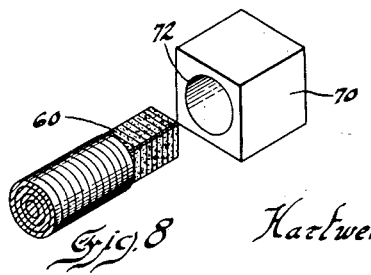
Figure 8 shows the squared end section ready to be applied to a tip.

The severed ends 60 of the wire are then placed in a die 62, preferably formed in two parts 64 and 66, as shown in Figure 7 and which may be placed in and operated from any suitable machine. These die halves are forced together over the relatively round welded end of the cable and are for the purpose of properly shaping the end of the length of cable so that it may be applied to the source of power or to the instrument. In Figure 8, I have shown the end 60 having a squared section to conform to the correspondingly shaped sections 68 of the die halves 64 and 66. While I have termed the section a squared section, it is to be understood by squared is meant any polygonal section. The squared end of the shaft is preferably slightly tapered in order that it may be readily inserted in a tip.

Referring to Figure 8, it will be seen that the squared end 60 is ready to be inserted into the tip 70, the opening 72 of which may be of any suitable shape. The shape of this opening is shown to be round in Figure 8, although it may be square or of any other polygonal formation. This tip is forced on by pressure and may be additionally secured in any suitable way.

After the tips 70 are applied, the cable lengths are ready for use and may be attached to any suitable connection. While I have shown a tip for use in connection with the cable lengths, such tip is not necessary for the reason that the squared end of the cable or shafting may be applied with equal facility directly to the instrument or source of power.

While I prefer to use the electrical method for heating the cable, it is to be understood that any other suitable heating means may be used.

I claim:

1. A new article of manufacture, a length of multistrand flexible cable or shafting having welded squared ends.

2. A new article of manufacture, a multistrand flexible cable or shaft, and an electrically welded squared end on said shaft or cable.

3. A new article of manufacture, a multistrand wire cable or shaft, and a welded squared end on said shaft.

4. The method of preparing multistrand wire cable or shafting consisting of heating a section of said cable or shafting to such a degree that the strands thereof molecularly adhere, and then cutting the section while in a heated state.

5. The method of preparing multistrand cable or shafting consisting of electrically heating a section of said cable or shafting until it adheres molecularly, annealing the section, and then cutting at the heated section while it is in the heated state.

6. The method of preparing multistrand cable or shafting consisting of heating a section of said cable or shafting until it adheres molecularly, annealing the section, and then cutting the section while still in its heated condition.

7. The method of preparing a multistrand cable or shafting consisting of welding a section of said cable or shafting, annealing the section, cutting the section while in the heated state, and then squaring the ends.

8. The method of claim 7, said squaring taking place while the ends are in a heated condition.

9. The method of preparing a multistrand cable or shafting consisting in welding a section of said cable or shafting, annealing the section, cutting the section while in the heated state, and then squaring the ends while they are still in their heated state.

10. The method of preparing multistrand cable or shafting consisting of electrically welding a section of the cable or shafting, annealing the section, and then cutting the section while in a heated state so that there will be no projecting ends at the circumference.

11. The method of preparing lengths of multistrand cable or shafting consisting of welding a section of said cable or shafting, cutting at the weld, squaring the cut ends, and then fastening tips.

12. The method of claim 11, the cutting being performed while the cable or shafting is in the heated state and being accompanied by a drawing of the strands at the place of cutting toward the center of the cable of shafting.

13. The method of preparing multistrand cable or shafting consisting of electrically welding a section of the cable or shafting, annealing the section, then cutting the section while in a heated state so that there will be no projecting ends at the circumference, and then squaring the cut ends.

14. The method of preparing multistrand cable or shafting consisting of electrically welding a section of the cable or shafting, annealing the section, then cutting the section while in a heated state so that there will be no projecting ends at the circumference, and then squaring the cable or shafting ends while said ends are in a heated condition.

In testimony whereof I affix my signature.

HARTWELL W. WEBB.